United States Patent [19]

May

[11] 4,125,105

[45] Nov. 14, 1978

[54] FOUR CYCLE INTERNAL COMBUSTION ENGINE

[76] Inventor: Michael G. May, Bel Air, CH 1180 Rolle, Switzerland

[21] Appl. No.: 767,870

[22] Filed: Feb. 11, 1977

Related U.S. Application Data

[63] Continuation-in-part of Ser. No. 630,624, Nov. 10, 1975, Pat. No. 4,094,272.

[51] Int. Cl.² .......................................... F02B 23/00
[52] U.S. Cl. ............................... 123/191 L; 123/30 D
[58] Field of Search ............ 123/30 D, 30 C, 32 SP, 123/191 L, 191 S, 191 SP

[56] References Cited

U.S. PATENT DOCUMENTS

| | | | |
|---|---|---|---|
| 1,897,233 | 2/1933 | Bullingtion | 123/191 L |
| 2,036,253 | 4/1936 | Bremser | 123/191 L |
| 2,076,590 | 4/1937 | Pope, Jr. | 123/191 L |
| 2,154,871 | 4/1939 | Schlorf | 123/191 L |
| 2,161,244 | 6/1939 | Burke | 123/191 L |
| 2,753,852 | 7/1956 | Beller | 123/32 SP |

FOREIGN PATENT DOCUMENTS

| | | | |
|---|---|---|---|
| 493,732 | 2/1930 | Fed. Rep. of Germany | 123/191 L |
| 592,614 | 6/1925 | France | 123/191 L |

Primary Examiner—Charles J. Myhre
Assistant Examiner—David D. Reynolds
Attorney, Agent, or Firm—Edwin E. Greigg

[57] ABSTRACT

An externally ignited four cycle internal combustion engine equipped with an inlet valve and an outlet valve, both valves being positioned on one side of the cylinder. A swirl (or vortex) chamber is provided within the cylinder head, the height of the swirl chamber being substantially less than its maximum diameter. The inlet and outlet valve discs lie substantially in a same plane. A channel-like recess in the cylinder head, which creates a guide channel when the piston is in its upper dead center position, terminates approximately tangentially in the swirl chamber.

14 Claims, 6 Drawing Figures

FOUR CYCLE INTERNAL COMBUSTION ENGINE

REFERENCE TO RELATED APPLICATIONS

This application is a continuation-in-part of Application Ser. No. 630,624, filed Nov. 10, 1975, now U.S. Pat. No. 4,094,272.

BACKGROUND OF THE INVENTION

This invention relates to an externally ignited fourcycle internal combustion engine in which the fuel-air mixture is formed outside of at least one cylinder. The present invention is concerned more particularly with such an internal combustion engine in which the inlet and outlet valves are arranged on one side of the cylinder. This engine is known as a side-valve or L-head engine. The combustion chamber of each cylinder in this engine is a volume surrounding the valve discs. It is designed to allow a substantially single vortex movement of the charge whereby the imaginary central axis of the swirl is substantially parallel to the cylinder axis. The height of the swirl chamber is typically less than its maximum diameter. A guide channel, originating approximately above the center of the piston head surface collects gases emerging from the cylinder volume when the piston approaches its top dead center position and directs them in a substantially tangential direction to the swirl chamber, thereby generating an essentially single swirl motion of the compressed charge during and toward the end of the compression stroke of the piston.

OBJECT AND SUMMARY OF THE INVENTION

The side valve arrangement in a four cycle internal combustion engine is well known to be outdated, essentially due to the fact that the obtainable specific output power and specific fuel consumption are rather poor. Furthermore, the exhaust gases contain a high amount of undesirable components, e.g., carbon monoxide and various hydrocarbon components.

For these reasons, this engine type has been largely neglected and, in some fields, e.g., the automotive industry, it has been completely abandoned.

Nevertheless, this type of engine is still being produced because it is relatively inexpensive and these engines are in use for powering lawn mowers, small electric generators, pumps, etc.

It is a principal object of this invention to provide an engine of the type described above, i.e., a side valve engine, sometimes referred to as an L-head engine, which is so improved that it has clear advantages by comparison with engines without swirl (vortex) chambers, especially in having a high thermodynamic efficiency with all advantages deriving therefrom and a high degree of completeness of combustion, so that, among other things, this engine expels only a relatively small amount of toxic exhaust gas constituents.

It is another object of the invention to obtain such results by only slightly modifying the known engine so as not to increase the production costs appreciably. According to the invention, only the already simple cylinder head needs to be partially reshaped.

These and other objects are attained, according to the invention, by providing, in an engine of the type described above, that the cylinder head (and/or the top of the piston) includes a channel-like recess which becomes a guide channel for the gases when the piston approaches and reaches its top dead center position. The guide channel terminates approximately tangentially in the swirl chamber and its extent is defined by the cylinder head and the top of the piston. The height and cross section of the guide channel may both increase from its origin above and near the center of the piston in the direction leading to the swirl chamber. The guide channel is so disposed that it creates a rotational gas flow in the swirl chamber whose axis is approximately parallel to the longitudinal axis of the cylinder. The rotational gas flow takes place at the latest toward and near the end of the compression stroke of the piston. The channel-like recess in the cylinder head and/or the piston, in cooperation with the approaching piston head surface, imparts a directed impulse to fuel-air mixture toward and into the swirl chamber. The guide channel is so configured that a substantially single rotational flow is generated within the swirl chamber and that its rotational axis is approximately parallel to the cylinder axis. The rotational flow leads to rapid combustion and low flow losses during the compression stroke and during the expulsion of the combusted mixture. Furthermore, the engine may be operated with a surprisingly lean fuel-air mixture. In addition, the fluctuation of the pressure characteristics of consecutive cycles is small in steady-state operation. The engine according to the present invention exhibits low fuel consumption, high specific power and expels only small amounts of toxic constituents in the exhaust gas. In addition, the engine tends not to "ping" or "knock" so that it may be operated at relatively high compression ratios using ordinary fuels. Nevertheless, the engine is inexpensive to manufacture. Furthermore, the mass production facilities for four cycle, internal combustion engines without swirl chambers can be readily changed over to the manufacture of internal combustion engines according to the invention at relatively low cost because, in the simplest case, only the casting of the cylinder head needs to be altered. It is known that flathead pistons have a minimum heat transfer area. Therefore, it can be suitably provided that the piston used is a flathead piston and that the channel-like recess is provided only in the cylinder head. In addition, this embodiment produces particularly low flow losses.

In order to further improve, i.e., to accelerate the combustion process, it may be suitably provided that, when the piston is in its top dead center position, then preferably at least 80 percent of the remaining volume of the combustion chamber is formed by the swirl chamber and by the guide channel.

In a preferred embodiment, the walls of the swirl chamber are continuously curved so as to form a spiraling enclosure provided with a rupture edge at the end of the spiral. It has been shown that this construction generally further improves the operational characteristics of the engine, especially when extremely lean mixtures are being used.

It is also generally suitable, according to the invention, to provide that the height of the swirl chamber is substantially less than its maximum diameter. It is especially advantageous if the height of the swirl chamber is approximately constant.

In general, the fuel mixtures which may be used in the engine can be further leaned out by providing that the spark plug is located in the vicinity of the end of the spiral enclosure. Furthermore, the propagation of combustion is enhanced if the ignition of the charge in the gap between the electrodes of the spark plug originates close to the top surface of the piston. A further improvement is achievable by concentrating the cooling around the spark plug and maintaining the squeezing or squish zone above the piston relatively hot so that the inner wall acquires temperatures in the range of from at least 120° C. to at most 350° C. during partial and full-load operation.

Preferably, the depth of the guide channel increases from the side adjacent to the rupture edge toward the opposite side. In a preferred embodiment, the guide channel points toward the area where the inlet valve is located, but the invention is not restricted to this embodiment.

The invention will be better understood as well as further objects and advantages thereof will become more apparent from the ensuing detailed description of an exemplary embodiment taken in conjunction with the accompanying drawing.

DESCRIPTION OF THE PREFERRED EMBODIMENT

Figure 2:
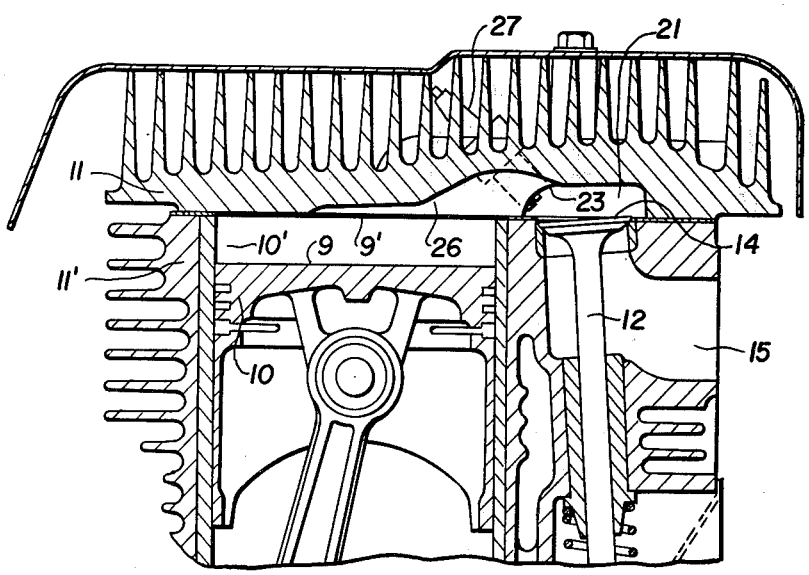
FIGS. 2 and 2A are cross-sectional views of the cylinder head of FIG. 1, the section being taken along the line C-C of FIGS. 1 and 1A, and also showing a portion of the cylinder wall and a portion of the piston.

In the preferred exemplary embodiment illustrated by FIG. 2, a piston 10 is embodied as a flat-head piston, i.e., it has a flat piston-head 9. A cylinder-block 11' includes an inlet valve 12. A portion of an induction tube 15 leading to the space above a valve disc 14 of the inlet valve 12 extends approximately perpendicular to the longitudinal axis of the inlet valve 12.

Figure 2A:
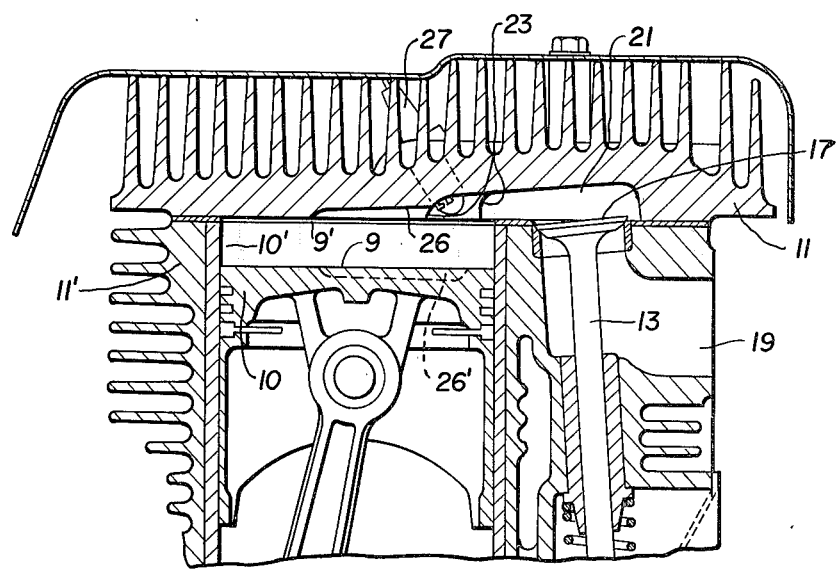

In the similar FIG. 2A, the valve shown represents the outlet valve 13 with an outlet valve disc 17 and outlet port 19.

Figure 1:
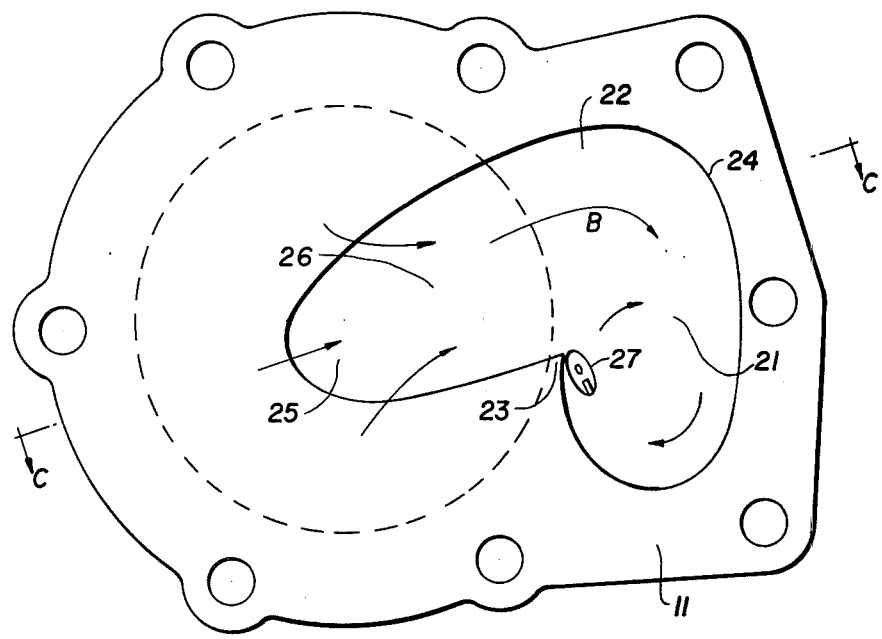
FIGS. 1 and 1A are bottom views of the cylinder head of a four cycle internal combustion engine according to the invention, only one cylinder being shown, although the engine may have additional cylinders.

It may be seen especially clearly from FIG. 1 that, originating in the vicinity of the cylinder axis, is a channel-like recess or cavity 26 which, in the exemplary embodiment, is worked into the inwardly facing surface of the cylinder head adjacent to and facing the top of the piston 9 and which extends up to the swirl chamber 21. Its height, as can be seen in FIG. 2, increases from the origin 25 up to the swirl chamber 21.

In the top dead center position of the piston 10, as shown in FIG. 2, this channel-like recess or cavity 26, together with the top of the piston-head 9, reaching position 9', forms a guide channel 26 which, as may be clearly seen in FIG. 1, terminates approximately tangentially in the circumferential wall 24 of the swirl chamber 21. The guide channel 26 can be considered to provide a directed fluid communication from the cylinder volume 10' to the combustion chamber surrounding the valves 12 and 13.

The cross-sectional area of the guide channel 26 also continually increases from its origin 25 up to the swirl chamber 21 due to its continuously increasing height. Its width increases only slightly throughout its length. The terminus of the channel-like recess or cavity 26 nearest the swirl chamber 21 merges smoothly with the latter.

One side of the channel-like recess or cavity 26 terminates at the circumferential wall 24 of the swirl chamber 21, in the location 23, in the manner of a breakaway or flow-separating edge so that the fluid flow entering the swirl chamber 21 out of this channel-like recess or cavity 26 during the compression stroke will break away from the wall. The other side of this channel-like recess or cavity 26 continuously extends into the circumferential wall 24 of the swirl chamber 21 at the location 22.

As may be understood from FIG. 2, the combustion chamber volume remaining when the piston 10 is in its top dead center position is determined substantially only by the volumes of the guide channel 26 and of the swirl chamber 21.

Suitably, as may be seen in FIG. 2, a spark plug 27 is inserted within the circumferential wall 24 of the swirl chamber 21 in the area of the break-away edge 23.

The smallest volume of the channel-like recess or cavity 26 is smaller than the volume of the swirl chamber 21. Preferably, a single swirl chamber 21 is provided in each cylinder. Except for the region containing the swirl chamber 21 and the channel-like recess or cavity 26, the remaining region of the surface of the cylinder head 11 is everywhere so close to the piston 10 in the top dead center position of the latter, that a so-called compression zone or squeezing (squish) zone is formed throughout this entire remaining region. The thickness of this squeezing zone is preferably as small as technically allowable, preferably in the range of 0.3 to 0.75 mm, depending on the size of the cylinder.

Figure 1A:
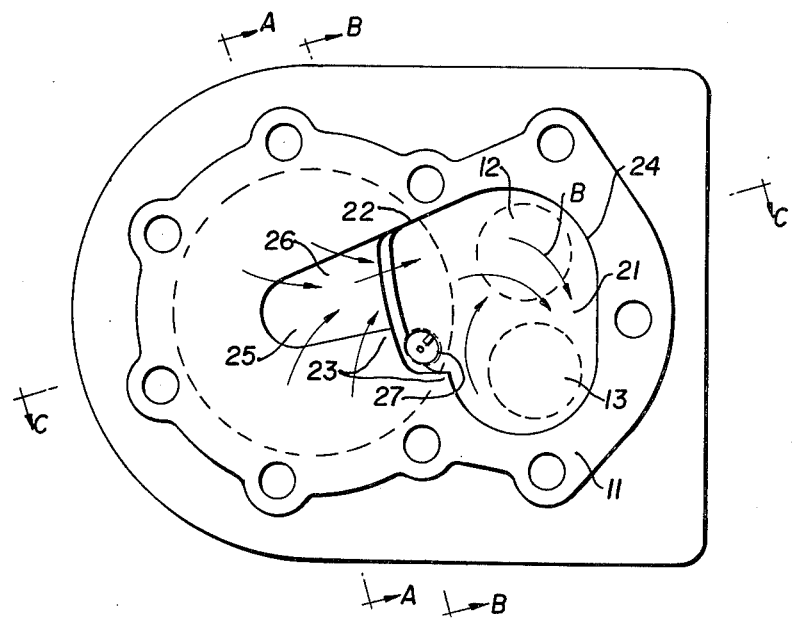
Figure 3:
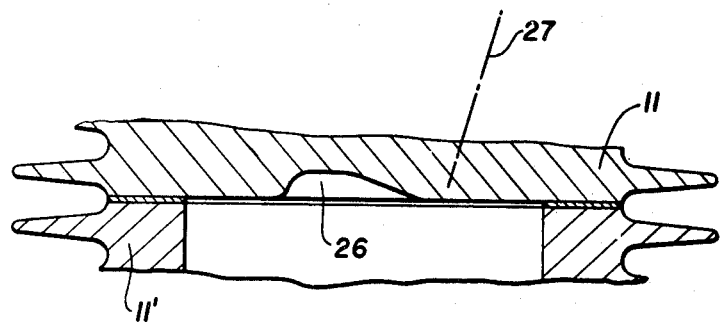
FIG. 3 is a cross-sectional view of a cylinder head along the line A—A of FIG. 1A.
Figure 4:
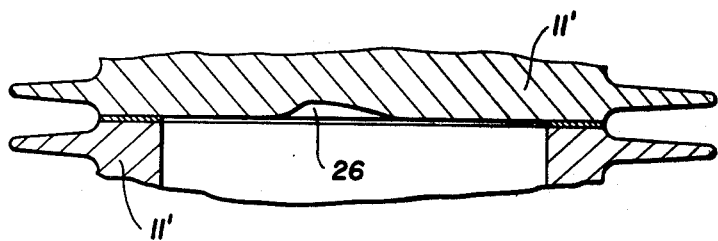
FIG. 4 is a cross-sectional view of a cylinder head along the line B—B of FIG. 1A.

FIGS. 3 and 4 are cross sections of the guide channel, along the lines B—B and A—A, respectively, showing the increasing depth of the guide channel toward the side opposite the rupture edge, i.e., toward the top of FIG. 1A. In FIG. 2 the guide channel is directed toward the inlet valve area; in the alternative embodiment of FIG. 2A it is directed toward the outlet valve area.

The following test sets forth the manner of operation of the sectionally illustrated cylinder when forming part of an externally ignited four-cycle internal combustion engine, not shown in further detail, and whose fuel-air mixture is produced in any known manner outside of the combustion chamber of the cylinder, for example by means of a carburetor or by fuel injection into an induction tube.

During the suction stroke of the piston, and in known manner, the downward motion of the piston 10 aspirates a fuel-air mixture into the combustion chamber while the inlet valve 12 is open. During the subsequent compression motion of the piston 10, this mixture is compressed and a slow rotational flow in the direction of an arrowhead line B (FIGS. 1, 1A) may already be formed at this time in the swirl chamber 21, conditioned by the channel-like recess or cavity 26. The rotational axis of this flow is approximately parallel with the longitudinal axis of the cylinder 10. Toward the end of the compressional motion of the piston 10, the top 9 of the piston 10 comes closer and closer to the channel-like recess or cavity 26 so that the flow occurring therein is reinforced and a relatively intensive flow of fuel-air mixture takes place, via the guide channel 26 being formed, into the swirl chamber 21, where it generates an intensive rotational flow in the direction of the arrowheaded line B. The spark plug 27 ignites the fuel-air mixture in known manner at adjustable crankshaft angles during the compressional motion of the piston 10, i.e., before the piston 10 has reached its top dead center position.

Due to the concentration of the mixture in the swirl chamber 21 and in the guide channel 26 and due to the intensive and orderly rotational flow prevailing in the same sense in the swirl chamber 21, the combustion process is rapid and a high degree of fuel utilization is achieved. After the piston 10 has passed its top dead center position, it is pushed downwardly and, during the next upward motion of the piston 10 and while the outlet valve 13 is open, the combusted gas is expelled in known manner.

An engine constructed as described above may be operated with very lean fuel-air mixtures, preferably with 20–40% air excess. It exhibits a low specific fuel consumption and the exhaust gas contains relatively few toxic constituents, so that, in spite of its simple construction and its relatively high specific power, it is compatible with the environmental regulations. In addition, the octane number of the fuel used may be relatively low.

As preferably provided in the above described exemplary embodiment, the channel-like recess or cavity 26 is located only in the cylinder head. However, in many cases, it may be suitable to form the guide channel 26 by opposite cooperating cavities in the cylinder head 11 and the top 9 of the piston 10. In that case, it ought to be generally suitable to make the depth of the cavity in the cylinder head 11 greater than the depth of the cavity in the top 9 of the piston 10. This variant is also illustrated in FIG. 2A, which shows a cavity 26' in the top of the piston by a dashed line. In special cases, the guide channel 26 may be formed exclusively by a depression or cavity in the top 9 of the piston 10 which is so shaped that, toward the end of the compression stroke of the piston 10, it channels gas into the swirl chamber 21 tangentially so that the gas executes a rotational flow along the circumferential wall 24 of the swirl chamber 21 or that at least a substantial component of this rotational flow lies along the circumferential extent of the swirl chamber 21. This variant is not illustrated.

It is to be appreciated that the exemplary embodiments of the present invention as illustrated and described in detail, and the variants mentioned have been set out by way of example and not by way of limitation. Thus, numerous other embodiments and variants are possible within the spirit and scope of the present invention, the scope being defined by the appended claims.

What is claimed is:

1. A four-cycle externally ignited internal combustion engine of the L-head type comprising:
   a cylinder block, defining at least one cylinder and including an inlet valve and an outlet valve for each cylinder;
   a cylinder head attached to said cylinder block;
   a piston moving reciprocatingly within said at least one cylinder thereby defining a combustion chamber of varying geometry;
   a swirl chamber in said cylinder head extending said combustion chamber into said cylinder head, said swirl chamber having a depth of penetration into said cylinder head which is less than the lateral extent of said swirl chamber and said swirl chamber having a curved wall, the plane projection of which approximately defines a spiral,
   a guide channel, defined by cooperation of said piston and said cylinder head when in proximity, said guide channel having two curved side walls originating in the vicinity of the central axis of said cylinder, the distance between said curved walls increasing in the direction of said swirl chamber, thereby defining a widening guide channel, whose maximum width is at least 2/3 of the diameter of said swirl chamber, one of said side walls merging with said wall of said swirl chamber smoothly and without discontinuity and the other of said side walls of said guide channel merging with said wall of said swirl chamber so as to define at least one beak-like projection extending into said guide channel; whereby, during compression, gases flowing through said guide channel enter said swirl chamber tangentially and are distrupted by said beak-like projection to form a substantially single vortex flow pattern in said swirl chamber, the axis of rotation of said vortex being substantially parallel to said cylinder axis.

2. An internal combustion engine according to claim 1, wherein said guide channel is partially formed in said cylinder head and partially on the top of said piston.

3. An internal combustion engine according to claim 1, wherein said piston is a substantially flat-headed piston and said guide channel is formed only in said cylinder head.

4. An internal combustion engine according to claim 1, wherein the combustion volume remaining when said piston is in its top dead center position is formed substantially at least by 80 percent by said swirl chamber and by said guide channel.

5. An internal combustion engine according to claim 1, said swirl chamber having a height substantially less than its maximum diameter.

6. An internal combustion engine according to claim 1, wherein portions of the top surface of said piston and portions of the surface of said cylinder head cooperate at TDC to form at least one squish zone, said squish zone being at least partly uncooled such that during partial and full-load operation, it acquires operating temperatures of at least 120° C. and at most 350° C.

7. An internal combustion engine according to claim 1, wherein a spark plug is located in said cylinder head preferably so that its electrodes can ignite the charge in a region lying near the end of the spiral extent of the combustion chamber.

8. An internal combustion engine according to claim 1, wherein a spark plug is located in said cylinder head so as to fire the charge adjacent to the piston top surface when said piston is in its top dead center position.

9. An internal combustion engine, according to claim 1, wherein portions of the top surface of said piston and portions of the surface of said cylinder head cooperate at TDC to form at least one squish zone, the thickness of said squish zone being preferably in the range of 0.3–0.75 mm.

10. An internal combustion engine, according to claim 1, wherein the height of the lateral cross section of said guide channel increases from a first side toward the opposite side, said first side having a beak-like inward projection which causes the gas stream to be disturbed and detached from the side wall of said guide channel.

11. An internal combustion engine, according to claim 1, wherein said guide channel is substantially directed toward that side of the combustion chamber wherein the inlet valve disc is operating.

12. An internal combustion engine according to claim 1, wherein the top of said swirl chamber is substantially flat and substantially parallel to the plane of its base.

13. An internal combustion engine according to claim 1, wherein the width of said guide channel at its junction with said swirl chamber is at least half as large as the largest diameter of said swirl chamber.

14. An internal combustion engine according to claim 1, wherein the height of said guide channel measured from the top of said piston in the top dead center position to the top of the guide channel is substantially less than the height of said swirl chamber and that the height of said guide channel increases in the direction of said swirl chamber beginning at the location of said beak-like projection, and further defined in that said beak-like projection lies within the geometrical extension of the cylinder surface.

* * * * *